United States Patent [19]
Atkinson

[11] Patent Number: 5,653,264
[45] Date of Patent: Aug. 5, 1997

[54] FLUID ORIFICE DEVICE HAVING ENCODED ORIFICE SIZE INDICIA

[76] Inventor: Louis D. Atkinson, 12535 W. Wilbur, New Berlin, Wis. 53151

[21] Appl. No.: 543,015

[22] Filed: Oct. 13, 1995

[51] Int. Cl.⁶ .............................. F15D 1/02; F16L 55/00
[52] U.S. Cl. .............................. 138/44; 138/104; 138/103
[58] Field of Search .............................. 138/103, 104, 138/40, 43–46, 114

[56] References Cited

U.S. PATENT DOCUMENTS

| | | | |
|---|---|---|---|
| 2,624,308 | 1/1953 | Wittlin | 138/104 X |
| 4,096,879 | 6/1978 | Serur et al. | 138/45 X |
| 4,275,768 | 6/1981 | Riggs et al. | 138/104 |
| 4,883,093 | 11/1989 | Miles et al. | 138/45 |
| 4,938,259 | 7/1990 | Schmidt | 138/45 |
| 5,228,478 | 7/1993 | Kleisle | 138/104 |
| 5,340,080 | 8/1994 | Cleland | 138/45 X |
| 5,354,530 | 10/1994 | Atkinson | 264/219 |
| 5,390,964 | 2/1995 | Gray, Jr. | 138/104 X |

*Primary Examiner*—David Scherbel
*Assistant Examiner*—Patrick F. Brinson
*Attorney, Agent, or Firm*—Andrus, Sceales, Starke & Sawall

[57] ABSTRACT

An orifice device includes a pneumatic orifice fitting having a molded tubular plastic body with attachment ends for connecting into a pneumatic system. The body is formed of a transparent plastic and has a central enlarged hex portion for a threaded connector. A cavity is formed in one end of the body. A plastic molded orifice body has a maturing conical enlargement and is secured within the cavity by a solvent bond. The orifice body is molded of a color related to the size of the orifice and the color is visible through the body and particular the hex portion. Other forms of visible indicia may be used. The orifice body is molded with an outward projection from the enlargement for use in assembly. The projection is moved in the plane of the enlargement and cavity.

14 Claims, 1 Drawing Sheet

FLUID ORIFICE DEVICE HAVING ENCODED ORIFICE SIZE INDICIA

BACKGROUND OF THE INVENTION

This invention relates to fluid orifice device having encoded orifice size indicia, and particularly to a pneumatic fitting including an orifice with orifice size indicia.

With the development of various fluid monitoring and controls, fluid fittings are often required to control and/or to sense the flow of fluid. Pneumatic devices or systems in particular, often require rather miniature, precise orifice devices interconnected into a flow system, with appropriate mounting to a support or other physical device. In a particularly practical and commercially desirable construction, a fitting is often provided consisting of an outer body or housing having a barbed end for interconnection to a hose, and a mounting end, such as a threaded post for interconnection to a support member or structure. Generally with present day technology, the fitting body is formed of brass or other metallic material and typically with the barbed end and an opposite end threaded member. The unit is recessed generally adjacent the mounting end with a precision formed orifice mounted within the body. The precision orifice unit is often and preferably a ruby body having a precision orifice formed therein in accordance with well-known technology. The orifice unit is then firmly secured within the brass or other metallic body. Such devices can be mass produced. The use of a precision ruby orifice however, results in a rather costly orifice unit. Further, the only way in which the size can be determined is by direct viewing of the ruby orifice body.

Generally, in all such devices known to the present inventor, the orifice device does not identify the size of the orifice. The matter is complicated by the fact that a standard fitting may be widely used for different orifices. Heretofore, the only method known to the inventor for determining the actual size of an orifice in a particular fitting is to remove the fitting and physically look into the fitting and analyze the size of the orifice. Accurate determination of the size of the orifice may involve practical considerations for maintaining proper system operation, prevention of adverse damaging effects on the components of the system, the need for replacement, the applicability of the system to a particular application, and the like. The visual analysis or removal and analysis is also a relatively time-consuming and costly process.

As a result of the prior art status, there is a significant demand for an orifice device, and particularly a small orifice device, consisting of a fitting with an internal orifice having a convenient method and structure for directly visually determining the size of the orifice, without the necessity of removal of the orifice device from the supporting structure. In addition, the device should preferably be adapted to mass construction as a fitting with an outer body member for mounting and connection of the fitting in a fluid system including hoses and the like, as well as a physical support structure as by a threaded coupler or the like.

SUMMARY OF THE PRESENT INVENTION

The present invention is particularly directed to an improved orifice device, which meets all the demands and the requirements both for an improved encoded orifice size, and particularly a fitting with an internal orifice with size encoding indicia identifying the orifice size, without the necessity of removal of the fitting, and is constructed and arranged with a separate orifice element mounted with a separate fitting. The indicia is preferably color-to-size related, such that viewing of the fitting will expose the size of the orifice. Further, in certain applications the size indicia is associated with the separate orifice element and viewed through a transparent portion of the fitting body.

The fluid orifice device is preferably formed of a molded plastic material for ease of manufacture and cost. The present inventor has developed an improved plastic orifice structure and a method of forming same, as more fully disclosed in U.S. Pat. No. 5,354,530 which issued Oct. 11, 1994 entitled Pressure Fluid Stabilized Regulator with Leakage Orifice and Method of Forming Precise Molded Orifice Units. A plastic body is molded of a plastic material and may be formed as a single piece unit or as a small member for mounting within a supporting body structure for attachment to a support element, such as a wall of a valve assembly or other supporting structure.

In a particularly unique and preferred structure of an orifice device in accordance with the present invention, a pneumatic orifice fitting includes an outer molded, plastic body having end attachment elements for connecting the device in a pneumatic system, and preferably a threaded post end. The fitting is an integrally molded body with a central passageway in a single integrated body. The body is formed of a transparent plastic and has a central portion constructed for convenient mounting of the body through the threaded connection as well as the hose connection. The fitting at the threaded connection is formed with a cavity or recess aligned with the fitting passageway. A plastic molded precise orifice unit is separately formed and includes an orifice body firmly affixed and secured within the cavity by any suitable means such as an adhesive, fusion bond, or other suitable mechanical and/or chemical methods. The orifice body includes a color indicia which is visible through a transparent portion of the fitting body. In a preferred construction, the central body portion of the fitting body is enlarged as by a hex-wrench portion for convenient mounting of the fitting. The fitting body and particularly the enlarged portion is transparent, and the color indicia of the orifice is clearly visible therethrough, particularly when viewed from the end of the fitting. The orifice structure may be conveniently formed of a colored plastic for a given orifice size. With different size fittings, the orifice structure or unit itself may vary, but again can be molded with an appropriate color for identifying the orifice size. A wide range of different colors are available for encoding different orifices in a single fitting size. Thus, a plurality of identical fitting bodies may be provided with orifice units secured in different body groups being of different colors to provide a series of color encoded orifices for identifying the precise size of the orifice in each fitting. Any other form of visible or detectable indicia, which can be provided on the orifice unit and viewed through the transparent or clear body portion can, of course, be used in place of color, or in combination therewith. The shape of the indicia or the orientation thereof with respect to the transparent portion of the fitting body may, for example, provide distinction based on visual presentation.

The present invention thus provides a highly practical orifice device for on-site and in-place identification of the orifice size of the orifice device, as well as providing the necessary identification and the fabrication of the particular orifice device. The molded plastic construction particularly provides a cost effective orifice device, while maintaining a high degree of precision and convenient in-place identification of the orifice size.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment. In the drawings.

DESCRIPTION OF THE ILLUSTRATED EMBODIMENT

Figure 1:
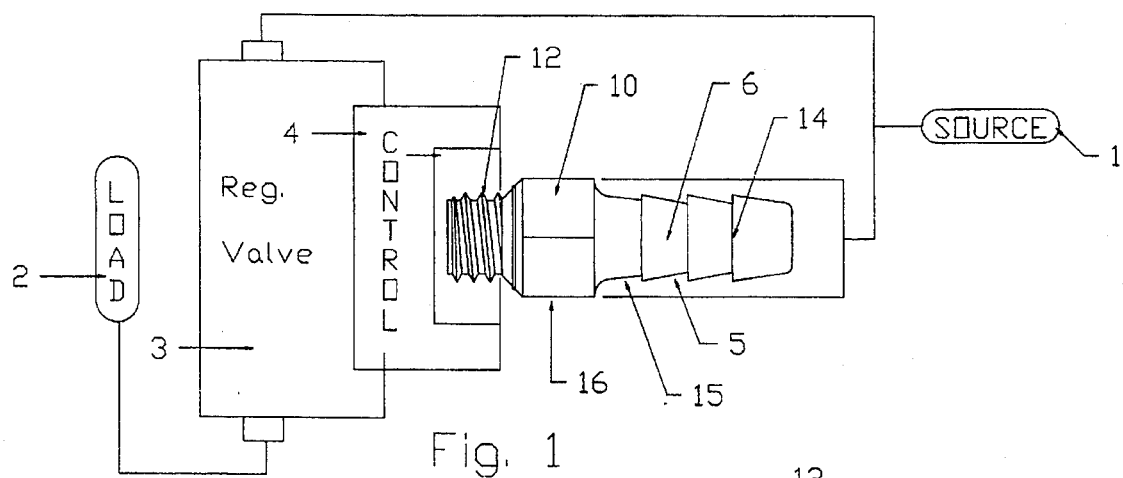
FIG. 1 is a diagrammatic illustration of a pneumatic system incorporating a single orifice fitting, constructed in accordance with an embodiment of the present invention.

Referring to the drawings, and particularly to FIG. 1, a simplified illustration of a pneumatic system is illustrated. A variable pressure source 1 is shown connected to supply a regulated pressure to a load 2, through a regulating valve 3 connected therebetween. A control unit 4 is coupled to the output of the source 1 through a precision orifice device 5 illustrating an embodiment of the invention. The precision orifice device establishes a precise flow related to the pressure of source 1. This flow is fed through the control unit 4 to control and maintain the regulating valve 3 in position to maintain a desired constant pressure at the load 2. Detailed illustration of such a system is disclosed in applicant's pending application entitled "Fluid Pressure Regulator Establishing Stable Output", which was filed Mar. 29, 1995 with Ser. No. 08/412,744. The precision orifice device 5 as illustrated may, of course, be applied in any other pneumatic system in which a precision flow from a pressurized source is required.

Figure 2:
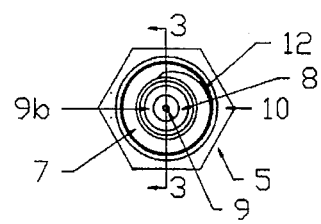
FIG. 2 is an end view of the fitting.
Figure 3:
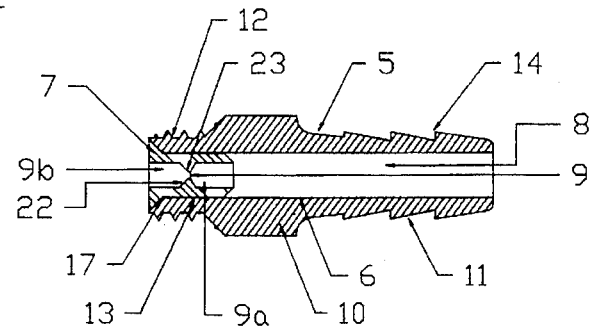
FIG. 3 is an enlarged axial cross-sectional view of the orifice fitting shown in FIG. 1.

Referring particularly to FIGS. 2 and 3, the illustrated orifice device 5 includes a fitting body 6 with a precision orifice unit or member 7 embedded in one end. The fitting body 6 has a central passageway 8 within which the orifice member 7 is fixedly secured. The orifice member 7 has a very precisely sized orifice 9 generally centrally of member 7 and in alignment with the passageway 8 of the fitting body 6. The orifice member 7 is a single body and firmly affixed to the fitting body 6 throughout the interface therebetween. The sized orifice 9 defines the controlling passageway through the orifice device. It provides a very precise controlled flow for any given pressure. The illustrated fitting body 6 has an enlarged body portion 10 between a the hose end 11 and a mounting end 12 which includes the orifice member 7. The body 6, and particularly portion 10, is visually transparent and thus orifice member 7 can be viewed therethrough. The orifice member 7 is formed with a colored surface 13 which is visible through the body 6 and particularly enlarged body portion 10 and encodes the size of the orifice. For example, a yellow color might represent an orifice opening of 0.01 inches, while a red color would represent a different size such as 0.02 inches.

More particularly, in the illustrated embodiment of the invention, the fitting body 6 is preferably an injection molded member formed of a clear transparent plastic such as clear polycarbonate resin. The hose end 11 of fitting body 6 is a generally elongated, tapered body portion having an external barbed surface 14 for receiving and grasping a hose 15 and providing for a fluid type connection therebetween. The mounting end 12 is a threaded member and is integrally formed on the opposite side of the central body portion 10. The threaded end 12 has a sufficient threaded length for secure interconnection to a support structure 16 such as a valve block or other suitable support. The integrally molded intermediate body portion 10 is a hex shaped member which projects circumferentially outwardly thereof for use of a wrench or other tool for mounting of the fitting to a physical support such as a valve block or the like. The raised portion presents a radial wall encircling the hose portion 11. The total body portion is thus an integral single piece molded member formed of a clear and transparent plastic.

The threaded end 12 is formed with a slight end cavity 17 at the end of passageway 8. The cavity 17 and passageway 8 correspond precisely to the outer surface shape of the molded plastic orifice member 7.

The molded orifice member 7 is formed of a suitable plastic, which is particularly a plastic which can be formed of any one of a great variety of colors. The member 7 is molded of a selected color for each size orifice in the range of orifices to be used with a particular fitting. The inventor has found that a colored polycarbonate plastic is particularly suitable for forming of the orifice member because it is compatible with the fitting material and permits the firm securement of the orifice member 7 within the fitting. The polycarbonate member 7 is readily solvent bonded within the fitting cavity in the fitting body 6 using standard materials and procedures.

The molded orifice member 7 is preferably molded as more fully disclosed in U.S. Pat. No. 5,354,530 and has a central passageway 19 with the sharp edge orifice 9 located generally centrally thereof. The inlet side 9a of passageway 8 has a constant diameter and terminates is a flat wall 20 at the orifice 9 and having orifice 9 extending therefrom. The orifice outlet side 9b of the orifice is shaped by a curved wall 22 joined to a straight orifice wall 23 defining the orifice 9. The orifice member when molded in accordance with the above patent is a sharp-edge orifice without flash or the like, creating a precision orifice structure.

Figure 4:
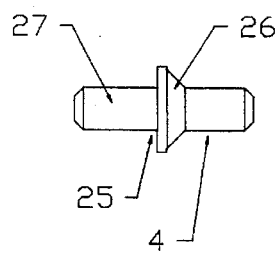
FIGS. 4 and 5 are a series of views for constructing the orifice unit shown in FIGS. 1–3.
Figure 4:
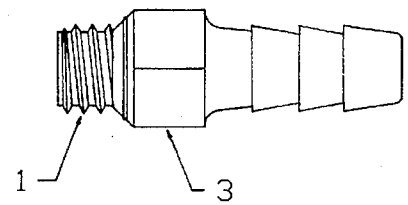
Figure 5:
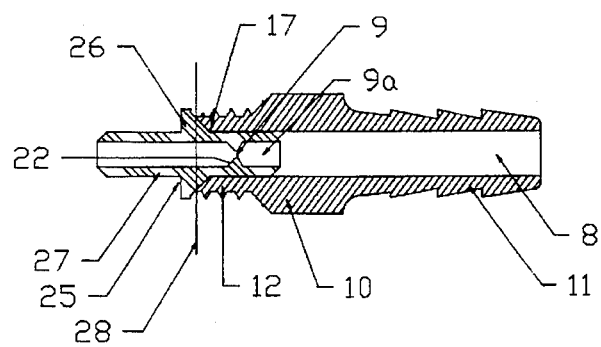

FIGS. 4 and 5 illustrate steps in forming of the fitting 5 with the separately molded orifice element 7 and fitting body 6. The orifice element 9 is molded as a tubular insert 25 having a centrally located conical portion 26. The outer diameter of insert 25 matches the inner diameter of passageway 8 of the fitting boy 6. The tubular insert 25 is inserted into the threaded end of passageway 8 with the conical portion 26 abutting the outer end of the conical cavity 17 of the body 6 and extending outwardly therefrom. The insert 25 is solvent bonded to the fitting passageway 8 along the interface therebetween. The outer projecting portion 27 of insert 25 is then removed along the end face of the threaded end 12, as along plane 28 to form the fitting as shown in FIG. 3.

The mounting end 12 is threaded into the support structure which is opaque. The fitting thus appears as a relatively clear body. However, in viewing of the fitting, particularly from the hose end 11, the color of the molded orifice member 7 clearly appears at the axially outer projecting end of the body portion 10 in the illustrated embodiment.

The illustrated fitting permits convenient and reliable fabrication of the system with defined orifice device as well as subsequent in-place monitoring and replacement of the various fittings by visual inspections of system fittings. This promotes the efficient assembly of the parts, and more significantly, the field installation can readily be checked and necessary fittings replaced with the proper fittings by merely inspecting the existing fitting.

Although the encoding of orifice units is shown as a color integrated into the orifice unit, the color may be separately applied as a surface element or treatment of the orifice unit. Further, any other visual indicia may be used, such as special shapes, lines of special size related configuration or assemblies, other unique inscriptions, and the like, which can be viewed through the outer clear fitting body. The basic teaching is a special fitting in which an embedded orifice member carries unique identifying indicia which can be externally monitored from an outer and exposed surface of the fitting. The preferred construction includes the fitting body with a transparent portion located to view a color encoded orifice element through said transparent portion with the fitting secured to a physical support or other element.

The present invention has been found to provide a highly cost effective pneumatic fitting with orifice size encoding, with the encoding constructed preferably within the unit.

Various modes of carrying out the invention are contemplated as being within the scope of the following claims particularly pointing out and distinctly claiming the subject matter which is regarded as the invention.

I claim:

1. An orifice device for precise flow control comprising an outer fitting body of a generally tubular construction and including a first end for interconnection to a fluid system and a second end for interconnection to a fluid system, a passageway extending through said fitting body, one end of said passageway including a cavity, a preformed precision orifice unit secured within said cavity and including a precision orifice aligned with said passageway, said fitting body including a transparent, light transmitting portion extending outwardly from said cavity, said precision orifice unit having orifice size indicia exposed on the outer surface of said orifice unit within said cavity, said indicia being viewable through said transparent portion of said fitting body.

2. The orifice device of claim 1 wherein said fitting body includes an intermediate portion having an exterior sidewall extended radially outwardly of said first and second ends, said transparent, light transmitting portion including said intermediate portion.

3. The device of claim 1 wherein said body is a molded plastic member formed of a clear transparent plastic.

4. The device of claim 1 wherein said orifice unit is a molded plastic member formed of a colored plastic, said color forming said orifice size indicia and said color being visible through said transparent portion of said fitting body.

5. An orifice device for precise flow control comprising an outer body of a generally tubular construction having a passageway and having first and second connecting members for interconnection in a fluid system, a precision orifice unit secured within said body to form a one-piece replaceable assembly, said orifice unit including a precision orifice aligned with said passageway, said body including a transparent portion, said precision orifice unit having orifice size indicia exposed to the outer surface of said orifice unit, and being located with said indicia viewable through said transparent portion of said body.

6. The orifice device of claim 5 wherein said body is formed of a clear plastic.

7. The orifice device of claim 6 wherein said clear plastic is a polycarbonate.

8. The orifice device of claim 6 wherein said orifice unit is formed of a colored plastic.

9. The orifice device of claim 8 wherein said colored plastic is a polycarbonate.

10. The orifice device of claim 5 wherein said precision orifice unit is secured in an end of said outer body, said outer body including an enlarged body portion adjacent the innermost portion of said orifice unit, said enlarged portion including said transparent portion and exposing said indicia on the outer end of said enlarged body portion.

11. The orifice device of claim 10 wherein said orifice size indicia includes a color at least on said outer surface of said orifice unit.

12. The orifice device of claim 10 wherein said orifice unit is formed of colored material to form said outer surface with said indicia as the color of said material.

13. The orifice device of claim 5 wherein said orifice unit has a orifice body with a conical outer enlargement aligned with an outer end of said passageway of said outer body, said end of said passageway having a complementary conical end cavity, and an adhesive between said enlargement and said cavity bonding of said enlargement to said cavity over the interface to form said one-piece replaceable assembly.

14. The orifice device of claim 13 wherein said orifice body has a projecting member extending outwardly of said outer enlargement, said projecting member adapted to be removed from said body and establish an essentially planar alignment of an enlargement and said outer end of said outer body.

* * * * *